(12) United States Patent
Filsoof et al.

(10) Patent No.: US 12,110,873 B2
(45) Date of Patent: Oct. 8, 2024

(54) NACELLE FOR WIND TURBINE AND METHOD FOR TRANSFERRING COMPONENTS

(71) Applicant: Vestas Wind Systems A/S, Aarhus N (DK)

(72) Inventors: Oliver Tierdad Filsoof, Brabrand (DK); Anders Yde Wollesen, Aarhus C. (DK); Torben Ladegaard Baun, Skødstrup (DK); Jens Torborg, Årre (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 17/923,956

(22) PCT Filed: May 12, 2021

(86) PCT No.: PCT/DK2021/050152
§ 371 (c)(1),
(2) Date: Nov. 8, 2022

(87) PCT Pub. No.: WO2021/228344
PCT Pub. Date: Nov. 18, 2021

(65) Prior Publication Data
US 2023/0175494 A1 Jun. 8, 2023

(30) Foreign Application Priority Data
May 15, 2020 (DK) .............. PA 2020 70322

(51) Int. Cl.
*F03D 80/50* (2016.01)
*F03D 80/80* (2016.01)

(52) U.S. Cl.
CPC ............. *F03D 80/50* (2016.05); *F03D 80/82* (2016.05); *F03D 80/881* (2023.08); *F05B 2230/61* (2013.01); *F05B 2230/80* (2013.01)

(58) Field of Classification Search
CPC ...... F03D 80/50; F03D 80/82; F05B 2230/80; F05B 2230/61; B64U 2101/26; B64D 29/08; B64D 29/00
See application file for complete search history.

(56) References Cited

U.S. PATENT DOCUMENTS

2008/0245756 A1* 10/2008 Dehlsen ................ B66C 23/207
212/224
2011/0247710 A1* 10/2011 Siegfriedsen ........... F03D 80/70
137/599.01

(Continued)

FOREIGN PATENT DOCUMENTS

| EP | 2363598 A1 | 9/2011 |
| EP | 2505541 A1 | 10/2012 |

(Continued)

OTHER PUBLICATIONS

Profix Window Systems Ltd, Swing and Slide Doors from Profix, 2016 "https://www.youtube.com/watch?app=desktop&v=EYGPEzLshQs" (Year: 2016).*

(Continued)

*Primary Examiner* — Juan G Flores
*Assistant Examiner* — Ryan C Clark
(74) *Attorney, Agent, or Firm* — Wood Herron & Evans LLP

(57) ABSTRACT

Aspects of the present invention relate to a nacelle (14) for a wind turbine generator (10), and a method for transferring components into and out of a wind turbine generator (10). The nacelle (14) comprises a housing (26) surrounding an internal volume (24) of the nacelle (14). The housing (26) has a maintenance opening (50). The nacelle comprises a (Continued)

carriage (54) configured to hold a component (48), the carriage (54) being movable between a first position and a second position to transfer the component (48) through the maintenance opening (50). When the carriage (54) is in the first position, the component (48) is held within the internal volume (24). When the carriage (54) is in the second position, the component (48) is held such that at least a portion of the component (48) is outside the housing (26).

15 Claims, 9 Drawing Sheets

(56) References Cited

U.S. PATENT DOCUMENTS

| | | | | |
|---|---|---|---|---|
| 2012/0085864 | A1* | 4/2012 | Kirt | B64B 1/06 |
| | | | | 244/137.2 |
| 2012/0136630 | A1* | 5/2012 | Murphy | F03D 17/00 |
| | | | | 702/188 |
| 2012/0146335 | A1* | 6/2012 | Bywaters | F03D 80/82 |
| | | | | 290/55 |
| 2013/0017086 | A1* | 1/2013 | Till | F03D 17/00 |
| | | | | 416/61 |
| 2013/0309090 | A1* | 11/2013 | Abolfazlian | F01D 25/12 |
| | | | | 416/1 |
| 2013/0315735 | A1* | 11/2013 | Arndt | F03D 80/00 |
| | | | | 416/146 R |
| 2017/0022966 | A1* | 1/2017 | Therkildsen | F03D 80/88 |
| 2018/0335023 | A1* | 11/2018 | Trede | F03D 9/25 |
| 2019/0277393 | A1* | 9/2019 | Hasan | F03D 15/00 |
| 2020/0071138 | A1* | 3/2020 | Aitken | F03D 13/40 |
| 2020/0109698 | A1* | 4/2020 | Pedersen | B64C 39/022 |
| 2020/0378368 | A1* | 12/2020 | Aitken | F03D 80/50 |

FOREIGN PATENT DOCUMENTS

| | | |
|---|---|---|
| JP | 2018013063 A | 1/2018 |
| KR | 20150041902 A | 4/2015 |
| KR | 20160007742 A | 1/2016 |
| KR | 101592904 B1 | 2/2016 |
| WO | 2007096008 A1 | 8/2007 |

OTHER PUBLICATIONS

Danish Patent and Trademark Office, Search and Examination Report in PA 2020 70322, Nov. 2, 2020.

European Patent Office, International Search Report and Written Opinion in PCT Application No. PCT/DK2021/050152, Aug. 31, 2021.

* cited by examiner

NACELLE FOR WIND TURBINE AND METHOD FOR TRANSFERRING COMPONENTS

TECHNICAL FIELD

The present disclosure relates to a nacelle for a wind turbine generator, a wind turbine generator, and a method for performing maintenance on a nacelle of a wind turbine generator.

BACKGROUND

Wind turbines for power generation are well known in the art. In common arrangements, at least one nacelle is mounted on a tower, with a rotor and blades being mounted on the nacelle.

Routine maintenance and inspection of wind turbine generators, which are often referred to simply as wind turbines, is typically performed manually. Each time work is required, a technician scales the tower of the wind turbine while the turbine is not operational, hauling a bag containing tools and replacement parts, and performs the maintenance as required.

This manual labour typically requires safety measures and precautions for the technician. As has already been noted, the wind turbine must be non-operational to permit the maintenance to be done, meaning time is wasted shutting the turbine down that could otherwise be used generating power. Sometimes, the maintenance may not even be allowed to proceed unless certain weather conditions are present. Where the wind turbine is part of an offshore or remote wind farm it may take a long time for the technician to get to the turbines in order to carry out maintenance.

It is an aim of the present invention to address one or more of the disadvantages associated with the prior art.

SUMMARY OF THE INVENTION

According to an aspect of the present invention there is provided a nacelle for a wind turbine generator. The nacelle comprises a housing surrounding an internal volume of the nacelle. The housing has a maintenance opening for transferring one or more components into and out of the nacelle. The nacelle comprises a carriage configured to hold the one or more components. The carriage is movable between a first position and a second position to transfer the one or more components through the maintenance opening. When the carriage is in the first position, the one or more components are held within the internal volume. When the carriage is in the second position, the one or more components are held such that at least a portion of the one or more components are outside the housing.

The provision of a maintenance opening in the housing of the nacelle provides a useful way for transferring components into and out of the nacelle. Similarly, the provision of a carriage to transfer the components through the maintenance opening provides a useful and uncomplicated solution to permit drone maintenance to be performed or for aerial vehicles to access, remove, and replace components within the nacelle.

Optionally, the carriage comprises a plate arranged to cover the maintenance opening when the carriage is in the first position.

Optionally, the carriage is configured to pivot about an axis to move between the first position and the second position. The axis may be parallel to a lower edge of the opening. The carriage may form a shelf beneath the maintenance opening when the carriage is in the second position. Alternatively, the carriage may be configured to move along an axis to move between the first position and the second position.

Optionally, the carriage comprises one or more mounts for removably securing the one or more components to the carriage. The one or more components may comprise modular components of a modularized internal system of the nacelle. The modularized internal system may comprise at least one of: an electrical converter; a control system; a drivetrain; and a sensing system.

The one or more components may comprises a fluid container. The carriage may be configured to connect the fluid container to a flow line to permit fluid flow between an internal system of the nacelle and the container.

The housing may comprise a main opening in a roof of the housing that is separate to the maintenance opening. The main opening may have a larger area than the maintenance opening. The housing may comprise an access opening for allowing access from a tower of the wind turbine generator, the access opening being separate to the maintenance opening.

The maintenance opening may be provided in one of: a side of the housing, a roof of the housing, a base of the housing, a front of the housing, and a rear of the housing.

Optionally, the nacelle comprises a drive system configured to move the carriage between the first and second positions, and a control system for controlling the drive system. The nacelle may further comprise a communications module for communicating with an unmanned aerial vehicle. The control system may be configured to control the drive system to move the carriage from the first position to the second position when it is determined that the vehicle is within a predetermined proximity to the nacelle.

In the first position, the carriage may be positioned within the internal volume directly adjacent the maintenance opening.

According to another aspect of the invention, there is provided a wind turbine generator comprising the nacelle described above.

According to another aspect of the invention, there is provided a method for transferring components to and from a wind turbine generator. The method comprises: operating an aerial vehicle to navigate from a base station to the wind turbine generator; exchanging one or more components between a mounting position on the aerial vehicle and an interior volume of the nacelle by transferring the one or more components through a maintenance opening in the nacelle; and operating the aerial vehicle to return to the base station.

Exchanging the one or more components may comprise transferring the one or more components from the aerial vehicle to the nacelle or transferring the one or more components from the nacelle to the aerial vehicle. The exchange may be performed by the aerial vehicle entering the nacelle, by part of the aerial vehicle extending in to the nacelle via the maintenance opening and grasping the component, by a carriage moving the component from the interior of the nacelle to the exterior and mounting the component to the aerial vehicle, or by the aerial vehicle depositing the component onto a carriage and the carriage moving the component into the nacelle.

According to another aspect of the invention, there is provided a system for transferring components to and from a wind turbine generator. The system comprises a wind turbine generator and an aerial vehicle. The wind turbine generator comprises a nacelle having a housing that surrounds an internal volume of the nacelle. The housing has a maintenance opening for transferring one or more components into and out of the nacelle. The nacelle and/or the aerial vehicle comprises a carriage configured to hold the one or more components. The carriage is movable between a first position and a second position to transfer the one or more components through the maintenance opening. When the carriage is in the first position, the one or more components are held within the internal volume. When the carriage is in the second position, the one or more components are held such that at least a portion of the one or more components are outside the housing.

According to a further aspect of the invention, there is provided a nacelle for a wind turbine generator. The nacelle comprises a housing surrounding an internal volume of the nacelle. The housing has a main opening in a roof of the housing and a maintenance opening for transferring one or more components into and out of the nacelle. The main opening is separate to and larger than the maintenance opening. The nacelle further comprises a mount for removably securing a modular component of the wind turbine generator to the nacelle. The mount is positioned directly adjacent the maintenance opening.

The mount may be positioned within the internal volume of the nacelle directly adjacent the maintenance opening. The modular component may be part of a modularized internal system of the nacelle. The modularized internal system may comprise at least one of: an electrical converter; a control system; a drivetrain; and a sensing system.

The nacelle may comprise a carriage on which the mount is provided. The carriage may be movable between a first position and a second position to transfer the one or more components through the maintenance opening, wherein: when the carriage is in the first position, the one or more components are held within the internal volume; and, when the carriage is in the second position, the one or more components are held such that at least a portion of the one or more components are outside the housing.

The carriage may be configured to pivot about an axis to move between the first position and the second position. Alternatively, the carriage may be configured to move along an axis to move between the first position and the second position.

The mount may be positioned on an outer surface of the housing. Where the mount is positioned on the outer surface of the housing, the modular component optionally comprises a maintenance station. The maintenance station may comprise a container for maintenance equipment. The container may comprise an access opening and may be configured to be secured to the nacelle via the mount so that the access opening is adjacent the maintenance opening.

Optionally, the housing comprises an access opening for allowing access through a tower of the wind turbine generator that is separate to the maintenance opening.

The maintenance opening may be provided in one of: a side of the housing, a roof of the housing, a base of the housing, a front of the housing, and a rear of the housing.

The mount may be positioned on the base of the housing. The nacelle may comprise a cover for selectively closing and opening the maintenance opening. The mount may be provided on the cover.

According to an aspect of the invention, there is provided a wind turbine generator comprising the nacelle as described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

For brevity, this discussion will refer to an 'aerial vehicle', also referred to as an 'AV', or 'drone' as any type of manned or unmanned aerial vehicle. Aerial vehicles may comprise relatively small-scale rotorcraft such as a multirotor, for example a tricopter, quadcopter, pentacopter, hexacopter, octocopter or a larger-scale helicopter. Where the term 'drone' or 'unmanned aerial vehicle' (UAV) is used herein, it should be appreciated that is also possible for manned rotorcraft in the same manner. Similarly, a 'crane' is any type of lifting device, whether it is a small maintenance crane mounted to wind turbine or a larger crane mounted to a maintenance platform, positioned on the ground, or positioned on a boat.

Figure 1A:
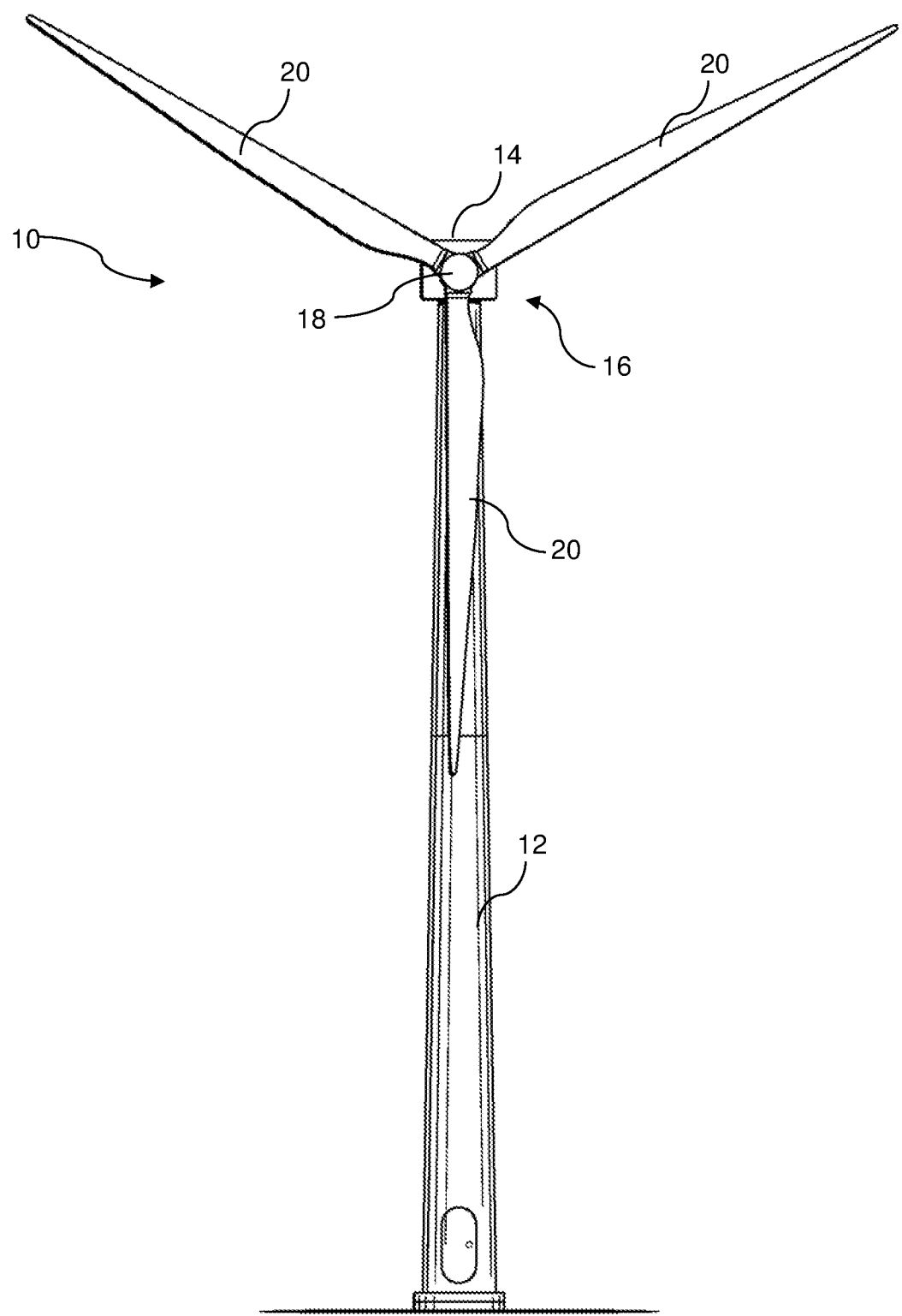
FIG. 1A shows a front view of a single-rotor wind turbine generator.
Figure 1B:
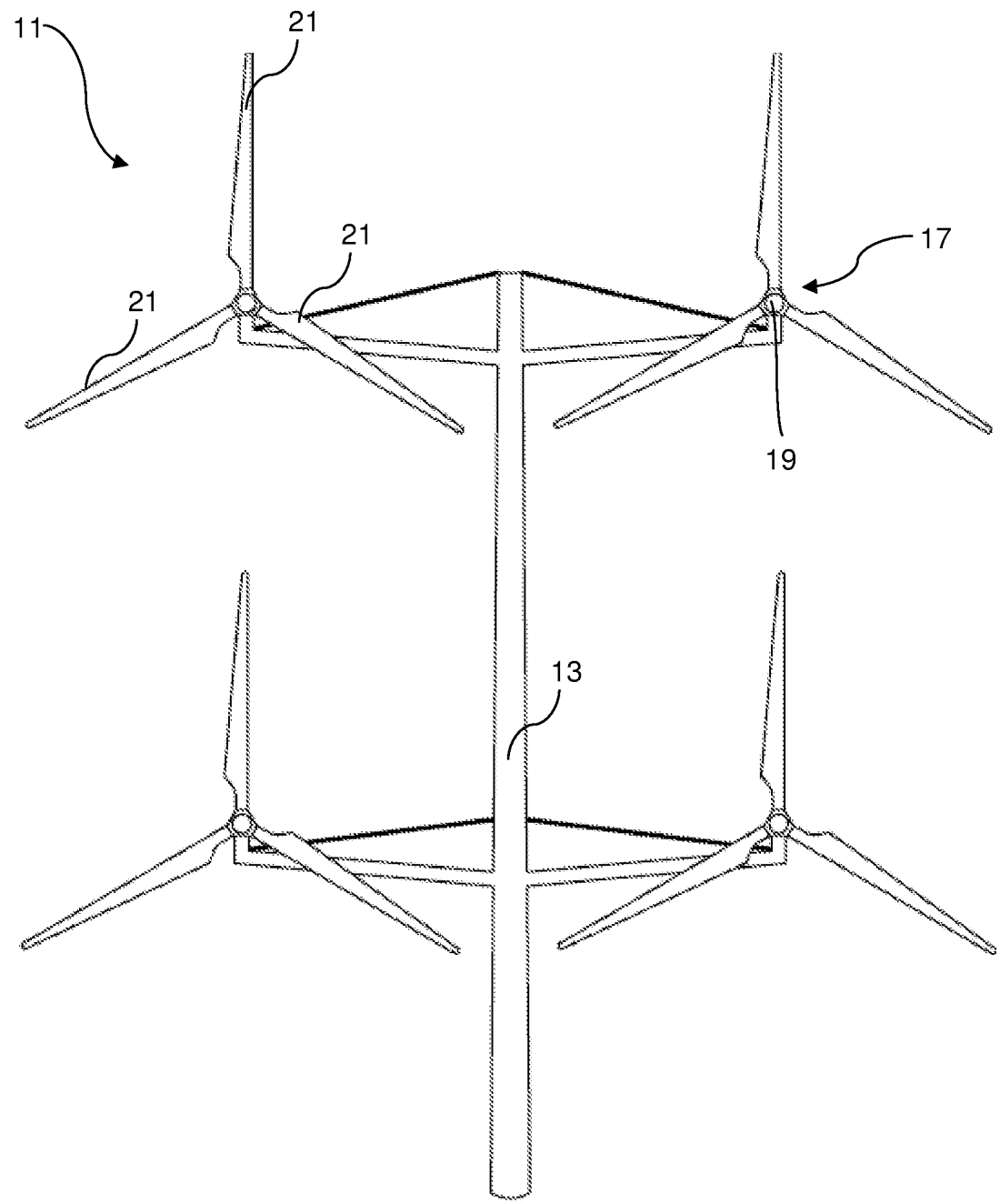
FIG. 1B shows a front view of a multi-rotor wind turbine generator.

Referring to FIG. 1A, a single-rotor wind turbine 10 is depicted. The single-rotor wind turbine 10 comprises a tower 12, a nacelle 14 mounted on top of the tower 12, and a rotor 16 rotatably mounted to the nacelle 14 having a hub 18 to which a plurality of wind turbine rotor blades 20 are coupled. The nacelle 14 is mounted on the tower 12 so that it can rotate about the major (vertical) axis of the tower 12 by way of a nacelle yaw control system (not shown) in order to turn and direct the rotor blades 20 into the wind direction. A multi-rotor wind turbine may also be provided, as shown in FIG. 1B. The multi-rotor wind turbine 11 has a single tower 13 from which branch multiple nacelle and rotor combinations. The turbine 11 in FIG. 1B has four rotors 17 attached to respective nacelles (not visible in FIG. 1B). Each rotor 17 has a hub 19 to which a plurality of wind turbine rotor blades 21 are coupled. In other embodiments, multi-rotor turbines may incorporate more or fewer than four rotors. Although the description and figures that follow discuss the methods and system of the invention in terms of single-rotor wind turbines, it will be appreciated that the concepts described and shown may also be applied to multi-rotor wind turbines. Thus, where the term 'wind turbine' is used, this should be taken to include any single- or multi-rotor wind turbine.

Figure 2:
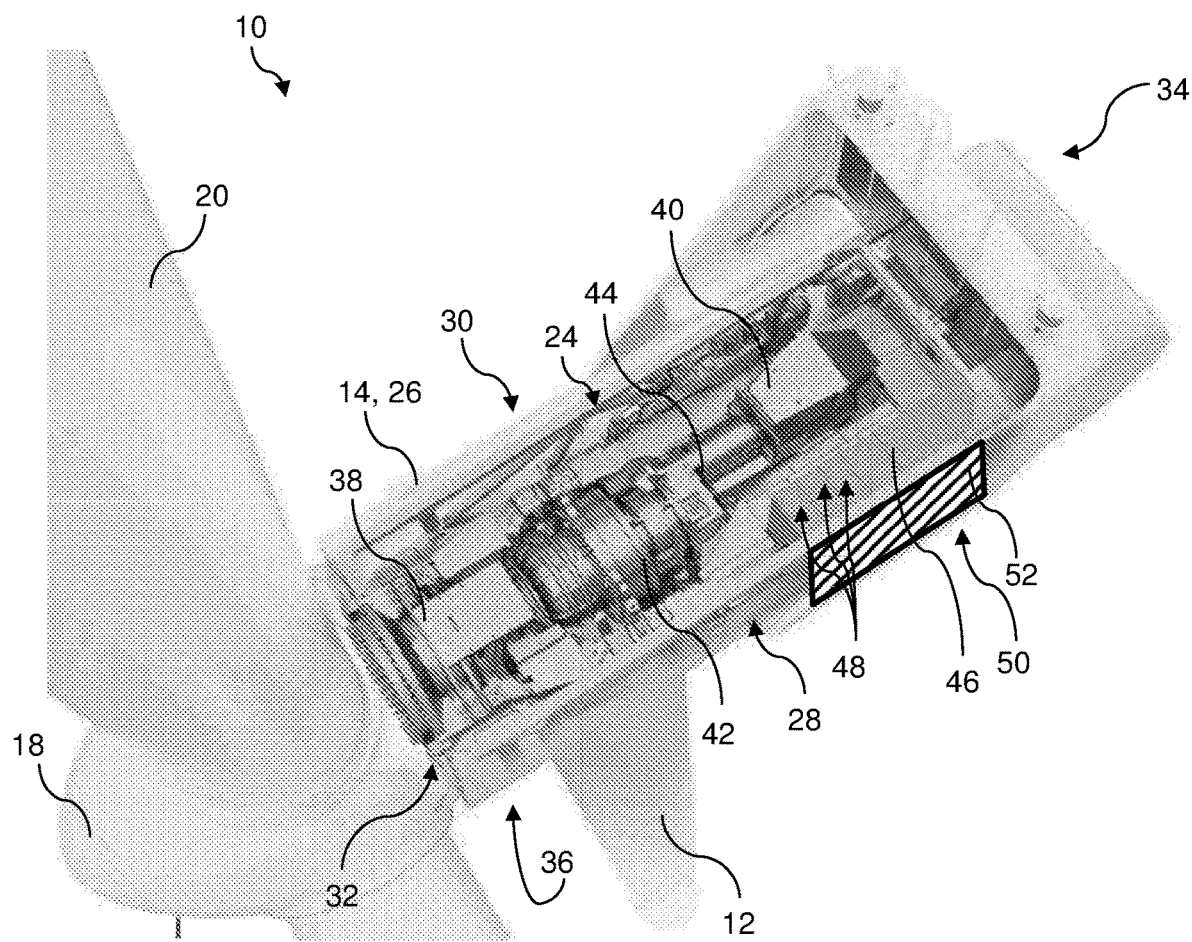
FIG. 2 shows a perspective view of part of a wind turbine generator with a schematically represented nacelle according to an embodiment of the invention.

FIG. 2 shows a perspective view of a wind turbine, such as the wind turbine 10 of FIG. 1A, in which an internal volume 24 of the nacelle 14 and the components therein are shown. The tower 12, hub 18, and blades 20 are also partially visible in perspective in FIG. 2. The nacelle 14 comprises a housing 26, also referred to as a body or cover, which is arranged to house and protect the components of the nacelle 14 housed within the internal volume 24 of the nacelle 14. The housing 26 comprises a first sidewall 28 and a second sidewall 30, a front wall 32, a rear wall 34, a nacelle base 36, and a nacelle roof (not shown). It should be noted at this point that terms such as 'front', 'rear' and 'side' are used here with reference to the orientation of the drawings, and such that the front wall 32 is taken to be the wall proximate to the hub 18 of the wind turbine 10. The nacelle base 36 provides a platform on which to mount internal components of the nacelle 14, although as will become clear later, internal components may also be mounted elsewhere within the nacelle. The nacelle roof covers the internal volume 24, and it is the nacelle roof which is not shown in FIG. 2 so that the internal volume 24 of the nacelle 14 is visible.

Within the internal volume 24, the nacelle 14 houses generating components of the wind turbine 10, which typically include a main bearing 38, a generator 40, a gearbox 42, and a brake assembly 44, as well as power converter equipment 46 for converting the mechanical energy of the wind into electrical energy for provision to the grid. In general, the hub 18 is supported on the nacelle 14 by the main bearing 38 and is configured to drive the gearbox 42 and, in turn, the generator 40. The generator 40 outputs AC voltage and current to the power converter 46 which then outputs grid voltage by way of a grid side connection in the form of a cable. It is noted that "direct drive" wind turbines do not use gearboxes as also known; a gearbox may therefore be optional.

The nacelle 14 also houses components not directly associated with the generation of power from the wind such as a wind turbine controller, although these components are not visible in FIG. 2. The controller is responsible for conducting local command and control tasks such as controlling power output, controlling rotor speed, controlling blade pitch, communicating with a central power plant controller and the like. It will also be understood that the illustration of the nacelle and the components housed within it is simplified for this discussion and that the nacelle would in reality include many other system components.

It is increasingly common for systems within the nacelle 14 to be modular and to comprise a plurality of modular components. Although not explicitly visible from the FIG. 2, in this embodiment the power converter 46 is a modularized power conversion system. Individual modules are shown and some are labelled with reference sign 48. Power converters, controllers, drivetrains, and sensing systems are all capable of being modular, and, as will be described below, such modularity lends itself well to interacting with the concepts that this document concerns.

Where components are discussed herein, this generally refers to operative components such as parts of systems, particularly modules of modular systems, within the turbine 10. Also included within this term are tools and other items useful for the maintenance of a wind turbine when used by a maintenance worker. For example, a component as used below may comprise a toolbox or spare part for fitting within a system within the turbine. In addition, a component may comprise a fluid container, containing a replacement fluid such as lubricant, oil, grease, coolant, or other operative fluids for use within the wind turbine. In the embodiments discussed below, for simplicity the components are the modules of the modularized power converter 46 unless stated otherwise. However it will be appreciated that the embodiments lend themselves to any of the components listed here.

Conventionally, maintenance of the wind turbine has been performed by maintenance workers who climb the tower and access the nacelle through an access opening between the tower and the nacelle. The roof of the nacelle is configured to have a main opening to permit access from above the turbine for delivery of larger components by, for example, helicopter. The opening in the nacelle is typically covered, in use, by doors movable to uncover the main opening. A worker in the nacelle may receive components through the main opening and manually fit those components in place.

However, in offshore and other hard-to-reach locations, access for maintenance workers is limited. If minor maintenance is required or desirable, it would be much more straightforward to permit an AV or crane to perform the maintenance. This also avoids unnecessary shut downs. AVs and cranes may also perform routine inspection of components.

Therefore, the arrangement of components and mechanisms for permitting access to the components within the nacelle is important when considering how AVs and cranes may be used to achieve maintenance of components, removal and replacement of components, and inspection of components within the nacelle.

Accordingly, as can be seen from FIG. 2, some components, in this case the modules 48 of the modularized power converter 46, are positioned to permit access to one or more components in a straightforward manner by an AV and/or crane. Particularly, the modules 48 are mounted within the internal volume 24 of the nacelle 14 directly adjacent the side wall 28 of the nacelle 14, and adjacent a maintenance opening 50 provided in the side wall 28. The modules 48 of the power converter 46 are mounted to respective mounts (not shown) within the housing 26. The mounts are positioned adjacent the maintenance opening 50.

A mount or component may be considered to be adjacent the opening if it is positioned close to the opening and accessible from the opening. In some regards, this means that there are no other components or other mounts between the maintenance opening 50 and the mount or component. In some circumstances, the components and/or mounts may be directly adjacent the opening so that there is substantially no separation between the component/mount and the opening 50. In some embodiments, direct adjacency may be achieved by providing the mounts and/or the components onto a cover, closure, or panel that opens and closes the maintenance opening 50 in use.

The maintenance opening 50, which is shown covered in FIG. 2 by a cover 52 represented by a hashed box, is provided in the side wall 28. Although depicted here as a single opening, each component or subsets of the components may be provided with a specific maintenance opening in embodiments.

The main opening (not shown) in the roof of the nacelle 14 and access opening (not shown) in the base of the nacelle 14 between the tower 12 and the nacelle 14 are separate to the maintenance opening 50. The roof opening will typically be larger than the maintenance opening 50.

During operation of the wind turbine 10, the maintenance opening 50 together with the positioning of the modular components 48 within the nacelle 14 adjacent the maintenance opening 50 enable easy access for an AV or crane. The AVs or crane may access the internal volume of the nacelle through the maintenance opening 50 to allow removal from the nacelle of the components and/or introduce components into the internal volume 24.

To further improve the ease with which cranes and/or AVs can interact with the nacelle 14 and its components, a carriage for carrying components is provided in some embodiments. The carriage is configured to transfer components through the maintenance opening 50. To transfer the one or more components, the carriage is movable between a first position and a second position. When the carriage is in the first position, the one or more components are held within the internal volume 24 of the nacelle 14, inside the housing 26. When the carriage is in the second position, the one or more components are held outside the internal volume 24 of the nacelle 14, and outside of the housing 26. Thus, when an AV and/or crane is deployed to inspect or remove a component, the movement of the carriage to the second position to dispose the component on the outside of the housing 26 makes the removal or inspection more straightforward. When an AV and/or a crane is deployed to transport a component to the nacelle 14, the carriage, in its second position, improves the speed and ease of the transfer. In both situations, the carriage provides a target for the AV/crane, and also provides an easy external system for receiving or presenting components. The presence of a carriage removes the difficult aspect of manoeuvring the AV to either fly through the maintenance opening or to transfer the component through the maintenance opening itself.

The carriage may be positioned in the nacelle 14 to be adjacent the maintenance opening, although the carriage's positioning may also be independent of the position of the maintenance opening provided it can be moved through the maintenance opening to achieve the second position. As will be made clear below, the carriage may be used in conjunction with other openings in the nacelle, such as the main, roof opening, all with the goal of improving the speed and ease of interactions between AVs/cranes, i.e. component handling systems, and the wind turbine generator.

The term carriage is intended to encompass component-receiving structures, mechanisms for permitting movement of parts of the carriage relative to one another, drive systems, and fixing structures that affix the carriage to the nacelle. In some embodiments below, where necessary the components of the carriage are discussed individually. For example, the part of the carriage configured to hold components is sometimes referred to as the carriage, and in other circumstances it is explicitly named as a drawer, rack, shelf, plate, or cradle. Where individual components of the carriage are not mentioned explicitly, it will be appreciated that these are still present—for example, the carriage is connected to the nacelle in a manner suitable for the particular embodiment and the operation of the carriage.

Figure 8:
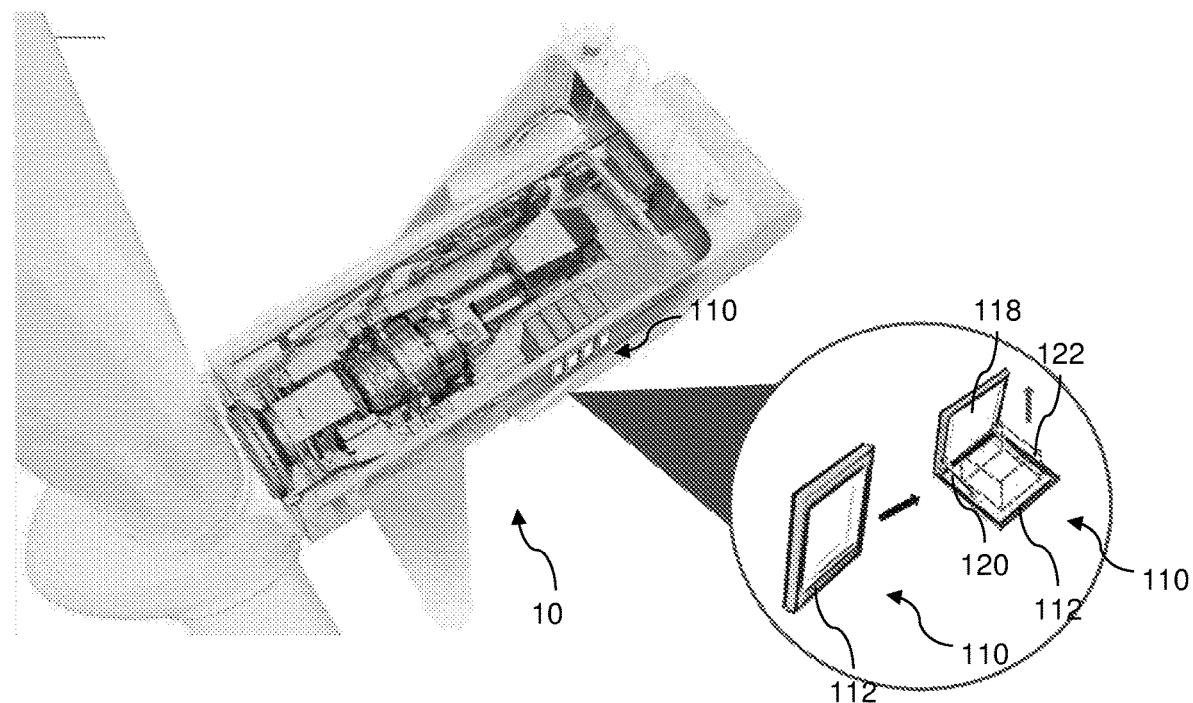
FIG. 8 shows a perspective view of part of a wind turbine with a schematically represented nacelle that comprises a carriage according to a further embodiment of the invention.
Figure 9:
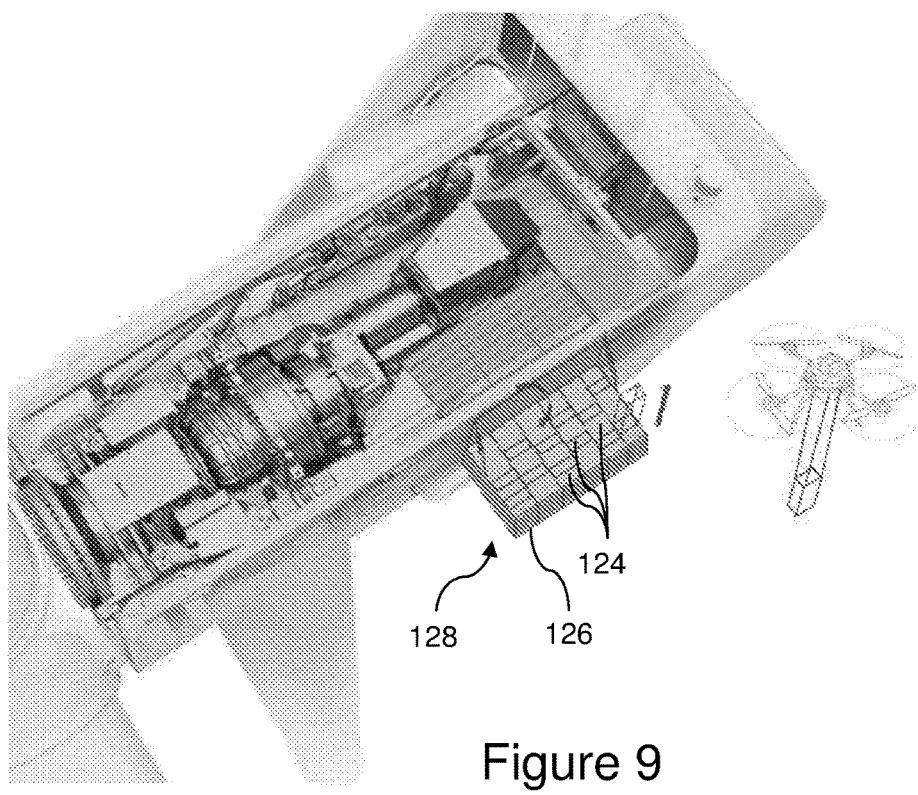
FIG. 9 shows a perspective view of part of a wind turbine with a schematically represented nacelle that comprises a carriage according to a further embodiment of the invention.

Below, embodiments of carriages that may be provided within the nacelle 14 are discussed in relation to FIGS. 3 to 8B. The carriages shown and described in relation to FIGS. 3 to 7B are carriages whose movement between the first and second positions is linear along an axis through, and generally perpendicular to the plane of, the opening through which the carriage moves. The carriages shown and described in relation to FIGS. 8 and 9 are carriages whose movement between the first and second positions is rotation about an axis, typically an axis aligned with the plane of the opening through which the carriage moves. Each of FIGS. 3 to 9 shows part of wind turbine including a nacelle having a similar arrangement to the nacelle of FIG. 2. Like features are labelled with the same reference signs.

Figure 3:
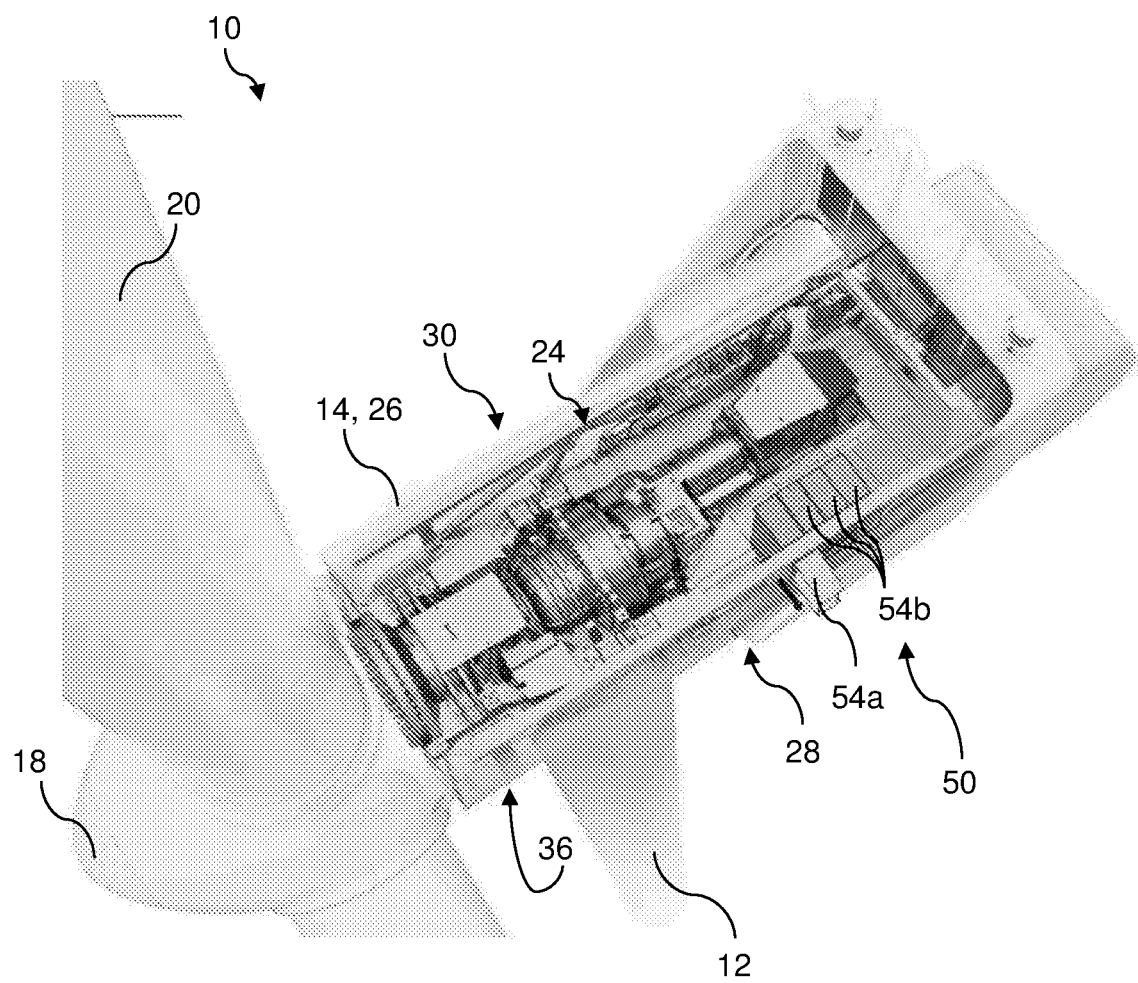
FIG. 3 shows a perspective view of part of a wind turbine with a schematically represented nacelle that comprises a carriage according to an embodiment of the invention.
Figure 4:
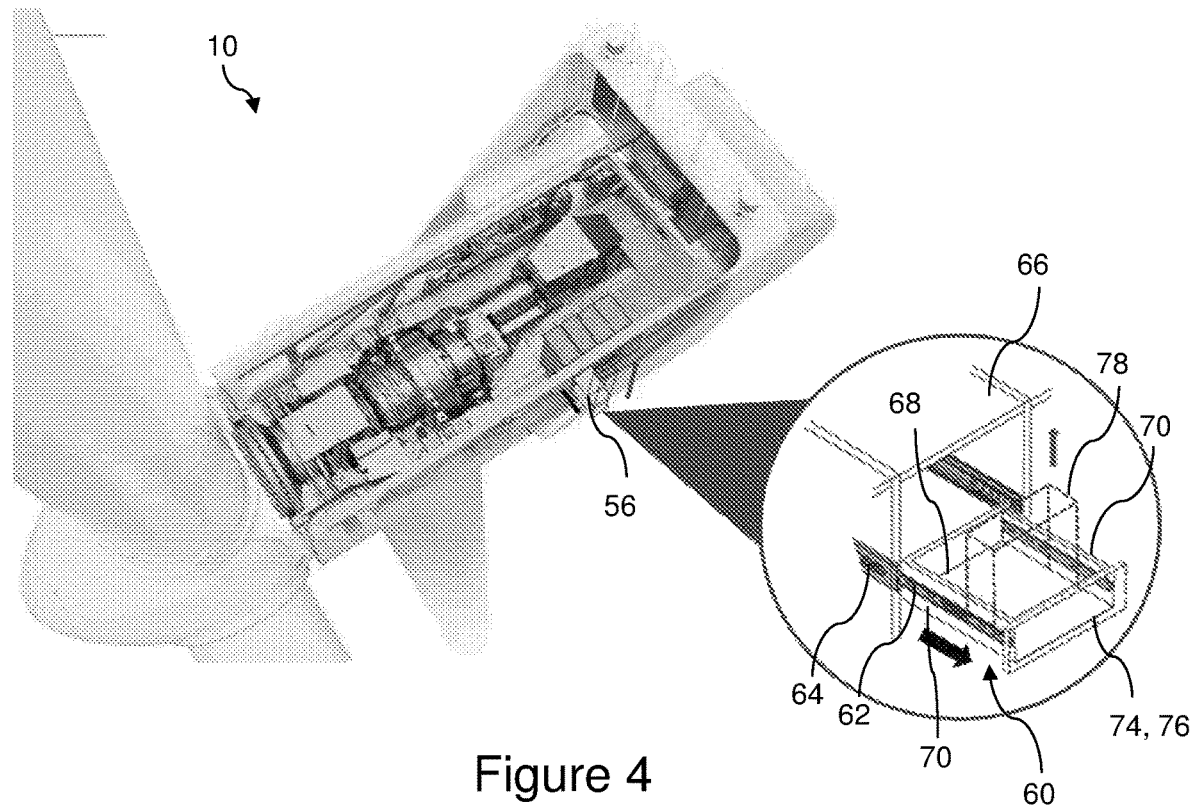
FIG. 4 shows a perspective view of part of a wind turbine with a schematically represented nacelle that comprises a carriage according to another embodiment of the invention.
Figure 5:
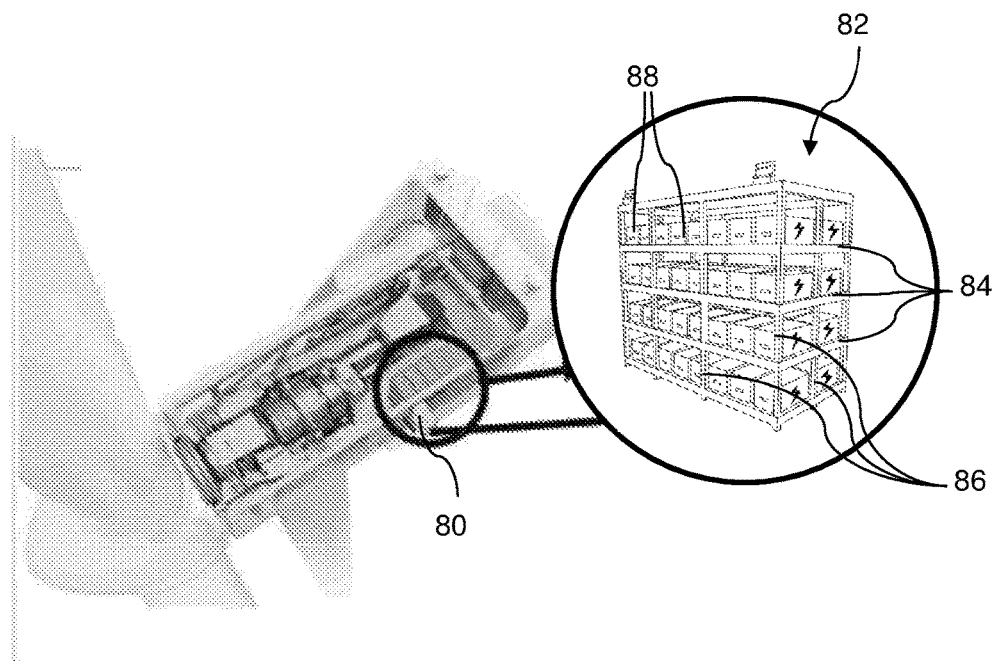
FIG. 5 shows a perspective view of part of a wind turbine with a schematically represented nacelle that comprises a carriage according to a further embodiment of the invention.

Turning now to FIG. 3, the nacelle 14 comprises a maintenance opening 50 in the side wall 28 of the housing 26 as in FIG. 2. Four carriages 54 are provided adjacent the maintenance opening 50. The carriages 54 are configured to move linearly on a substantially horizontal axis through the maintenance opening 50. In FIG. 3, the first carriage 54a, which is the carriage closest to the rotor of the wind turbine has been moved to the second position. In this position, the component 48 provided on the carriage 54a is disposed and held outside the internal volume, so that it is accessible by an AV and/or crane. The other three carriages 54b are illustrated in their first position, so that the components 48 they hold are within the internal volume 24 of the nacelle 14. The form of the carriage 54 may vary depending upon the components it is designed to hold. Specific examples of different linearly-moving carriages that extend through a maintenance opening in the side wall 28 of the housing 26 are shown in FIGS. 4 and 5. Examples of linearly-moving carriages that extend through a maintenance opening 50 in the base and roof of the housing 26 are shown in FIGS. 6 and 7 respectively.

In FIG. 4, a carriage 56 is shown in the enlarged, callout view in the second position. The carriage 56 extends through the maintenance opening 50. The carriage 56 comprises a drawer 60 for holding one or more components 48. Rails 62 attached to the side of the drawer 60 cooperate with corresponding rails 64 attached to a support structure 66 within the internal volume 24 of the nacelle 14 so that the drawer 60 moves between the first and second positions by sliding of the rails 62, 64 relative to one another. The support structure 66 is fixed to the base 36 and/or side wall 28 of the nacelle 14 to support the linear movement of the drawer 60. The support structure 66 is fixed to the nacelle 14 by a fixing (not shown) that is sufficiently strong to maintain the drawer 60 in the position shown in FIG. 4 when the drawer 60 is in the second position.

In the callout of FIG. 4, a single drawer 60 is shown. In some embodiments, the maintenance opening is dimensioned to permit a single carriage to pass through, while in others the opening is dimensioned to permit a plurality of carriages to pass through simultaneously. For example, the opening in FIG. 4 is dimensioned to permit two carriages, stacked vertically relative to one another, to move through, although only a single drawer is shown. In some embodiments, more than one carriage is configured to pass through a maintenance opening although the maintenance opening is only dimensioned to permit one carriage to pass through it. In some embodiments, a carriage may comprise a slot or opening for receiving components and a drive system for moving the component within the carriage, such that the carriage holds a plurality of components and is configured to receive more components up to its capacity through the slot. In these embodiments, the controller is also configured to select a component to be presented to an AV, and to operate the drive system so that the selected component is within the slot for removal by the AV. For example, such a system may allow the provision of insertable cassettes. The cassettes may be replacement filters for a filtration system within the nacelle or other replaceable componentry. A plurality of cassettes may be loaded and used or only one cassette may be used at any time, the remaining cassettes being provided for replacing the one cassette.

Returning to the embodiment of FIG. 4, the drawer 60 comprises a base 68 and four sides, with two of the sides 70 being the sides to which the rails 62 are attached. Attached to the front side 74 of the drawer 60 is a cover plate 76 that is configured to sit flush with the housing 26 of the nacelle 14 when the drawer 60 is in the first position, in order to close part or all of the opening 58. The front side of the drawer may comprise the cover plate.

The drawer 60 permits access to components held therein, or, if no components are held therein, to the space it provides for components. In FIG. 4, a component 78 is indicated with a dotted line. The component 78 and/or space in the drawer 60 are accessible from above. Components held by the drawer 60 may be lifted directly upwards out of the drawer by an AV or crane once the drawer 60 has been moved to the second position. Of course, while in the first position, the components may be removed from the drawer 60 by a maintenance worker within the nacelle 14.

FIG. 5 shows a carriage 80 comprising a rack 82. As with the drawer 60 of FIG. 4, the rack 82 is configured to move along an axis through the side 28 of the housing 26 of the nacelle 14. As with the embodiment of FIG. 4, the axis along which the rack moves is also a horizontal axis extending through the maintenance opening. In general, these axes are transverse to the longitudinal axis of the nacelle.

The rack 82 may be mounted on a sliding platform, may have a set of rails attached thereto similar to the drawer of FIG. 4, and/or may be otherwise mounted to the nacelle to permit sliding through the opening between the first and second positions. The rack 82 slides relative to a support structure (not visible in FIG. 5) attached to the nacelle 14.

The rack 82, shown in more detail in the callout of FIG. 5, comprises a plurality of shelves 84 stacked vertically on top of one another and maintained relative to one another by struts 86. In some embodiments, a rack 82 comprises a single shelf. The rack 82 is configured to permit access to a plurality of components 88 provided on each shelf. Access is gained from the sides of the rack 82. Components on the top shelf may also be accessed from above. The arrangement of the rack 82 to permit side access lends itself to smaller components such as battery cells.

Figure 6A:
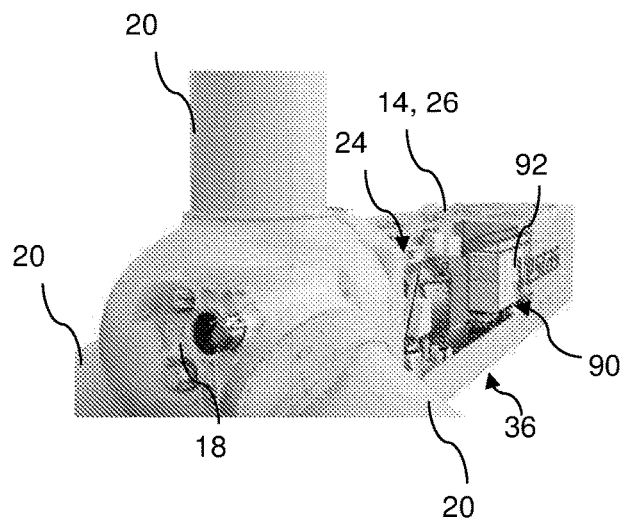
FIGS. 6A and 6B show perspective views of part of a wind turbine with a schematically represented nacelle that comprises a carriage according to an embodiment of the invention, the carriage being in a first position in FIG. 6A and a second position in FIG. 6B.
Figure 6B:
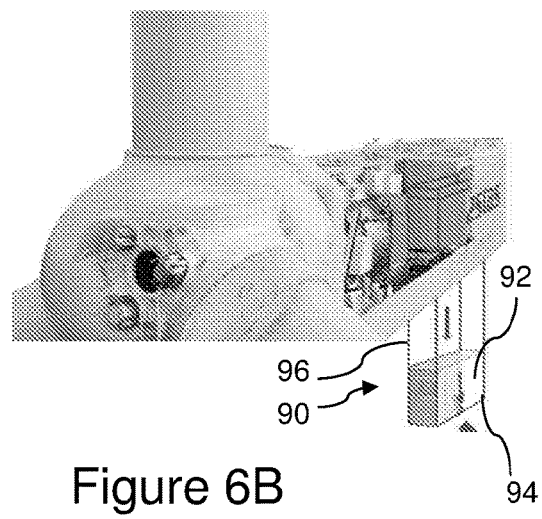

FIGS. 6A and 6B illustrate a nacelle 14 comprising a carriage 90 configured to move vertically between first and second positions. Depicted in FIGS. 6A and 6B is a rotor 18, viewed in a front perspective view, along with the roots of the blades 20 and the nacelle 14. Part of the housing 26 of the nacelle 14 is cut away to illustrate the internal volume 24.

In FIG. 6A, the carriage 90 and component 92 it carries are illustrated within the internal volume 24, the carriage 90 being in the first position. In FIG. 6B, the carriage 90 is depicted in the second position, with the carriage 90 and component 92 being external to and hanging beneath the housing 26. The carriage 90 and component 92 move between the first and second positions along a vertical axis, through a maintenance opening (not visible in these figures) in the base 36 of the nacelle 14. In other words, the first position is vertically above the second position. The carriage 90 comprises a component-holding cradle 94 and a system for moving the cradle 94. The system for moving the cradle 94 may comprise rails for sliding the cradle between positions, and/or a winching system to lower the cradle through the opening using cables. The cradle 94 may be configured to release the component 92 vertically downwards so that, in order to mount or remove a component, an AV or crane positions itself beneath the component. In other examples, components may be removed upwardly or to the side from the cradle 94.

Figure 7A:
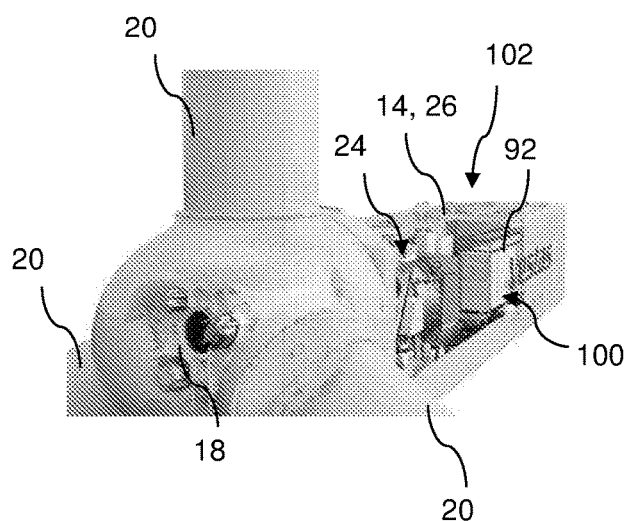
FIGS. 7A and 7B show perspective views of part of a wind turbine with a schematically represented nacelle that comprises a carriage according to an embodiment of the invention, the carriage being in a first position in FIG. 7A and a second position in FIG. 7B.
Figure 7B:
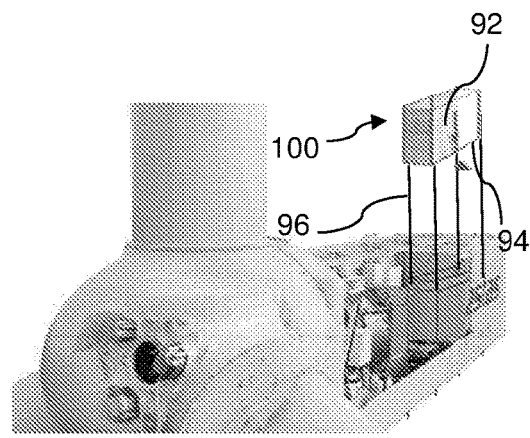

FIGS. 7A and 7B illustrate another carriage 100 configured to move vertically between the first and second positions. The embodiment in FIGS. 7A and 7B differ from the embodiment of FIGS. 6A and 6B in that the second position is vertically above the first position rather than vertically below the first position. Accordingly, the maintenance opening (not shown) in FIGS. 7A and 7B is in the roof 102 of the nacelle 14. If a main opening is provided in the roof of the nacelle, the maintenance opening and main opening are separate. It is envisaged that the main opening will have a greater surface area than the maintenance opening.

As in FIGS. 6A and 6B, the carriage 100 comprises a cradle 94 carrying a component 92. The cradle is moved by a cradle-moving system 96.

An AV or crane may be controlled to remove the component 92 by positioning their lifting apparatus above the component 92 and lifting the component vertically upwards or to the side. For placing a component 92 into the carriage 100, the AV or crane lowers the component 92 into the carriage 100 from above the carriage 100 when the carriage 100 is in the second position.

A carriage that raises the component vertically upwards between the first and second positions is also compatible with the main opening—a separate maintenance opening may not be required where the carriage raises the component upward and outward.

In some embodiments, particularly the embodiments of FIGS. 6A/B and 7A/B, the carriage or part of the carriage may be removable by an AV or crane. Rather than removing the component, the carriage comprises a release mechanism. In use, the component-carrying part of the carriage is moved to adopt the second position and the AV/crane is manoeuvred and operated to securely connect to the component-carrying part of the carriage. Once a secure connection is established, the release mechanism detaches at least the component-carrying part, variously called the cradle, rack, drawer above, of the carriage from the nacelle. The part of the carriage that was removed may then be replaced with a replacement component and component-carrying part. This simplifies the interaction between the carriage and the AV/crane, and permits different component-carrying cradles to be used with the same carriage system.

The carriages discussed up to now have been linearly-moving carriages. However, in some embodiments such as those shown in FIGS. 8 and 9, the carriages may move between the first and second positions by rotating about an axis.

FIG. 8 shows a nacelle 14 and other components of the wind turbine 10, which have already been shown and described in relation to FIG. 3. In FIG. 8, the carriage 110 comprises a door 112 that rotates about a hinge 114 along a bottom edge 116 of a maintenance opening 118 in the side wall 28 of the housing 26. The door 112 of the carriage 110, in the first position shown in the left part of the callout, is configured to close the maintenance opening 118. In the second position shown in FIG. 8 in the right part of the callout, the door 112 is rotated to a substantially horizontal position relative to the maintenance opening 118. The movement of the door 112 may be restrained so that it does not over-rotate. Here, rotation is constrained by a pair of hydraulic arms 120 connecting the door 112 and the housing 26.

In the second position, the door 112 forms a shelf extending from and beneath the maintenance opening 118. The component, here indicated by a dotted line and reference sign 122, may be provided on the shelf, either by being mounted to the door 112, or by being passed through the opening 118 onto the door 112 by an internal system or worker. Moving the door from the second position to the first position therefore moves the components from the outside to the inside of the nacelle housing.

While the door 112 of FIG. 8 is intended for individual components, a rotating door may also be used for a plurality of components. In FIG. 9, a plurality of components 124 is provided, each mounted to a specific mount (not visible) provided on a door 126 of a carriage 128. While the door 112 of FIG. 8 is dimensioned for only a few components 122 to be placed thereon, the door 126 of FIG. 9 is configured to have many components 124 mounted thereto, and so is dimensioned appropriately. Moreover, the door 126 of FIG. 9 permits mounting of components 124 directly to the door—this particularly lends itself to modularity, as an entire converter, control system, and/or another large component of the turbine 10 could be mounted to the door 126 and rotated out as required. In this case, a plurality of mounts (not visible) are provided on the door for receiving components—the mounts may include a mechanism for disconnecting their respective components 124 from the mount. The modular components may be configured to connect directly to one another to achieve the modular system and/or the door 126 and mounts may also interconnect the components to allow the modular system to operate. In doing so, the door may become part of the modular system, acting as a base for the system and permitting operation through it.

Although rotatable carriages are shown in the Figures as rotating about a substantially horizontal axis, in other embodiments, the carriage rotates about a non-horizontal axis. A rotating carriage may be employed to uncover maintenance openings in the base or roof of the nacelle.

In some embodiments, the movement of the carriage may be a combination of rotation and linear movement. Carriages may also be configured to perform a further movement once the component is disposed externally to the nacelle to expose the component for pick-up or to permit placing of a component into the carriage. For example, a cover may be provided over a volume of the carriage that is opened once the carriage has moved to its second position. Where the rack of FIG. 5 is used, the further movement may comprise advancing one or more components to be disposed out of the rack.

The carriages described herein automatically close the maintenance opening when they adopt the first position by virtue of an end plate or door. In other embodiments a separate plate or cover may be provided to cover and uncover the opening.

As discussed above, components may be modular components, spare parts for systems within the nacelle, tools, other items for use by maintenance workers and/or fluid containers. Where the component comprises a fluid container, a fluid flow line may be provided within a mount of the carriage, within the carriage itself, or in the region of the carriage. When the fluid container is mounted to the carriage, the fluid flow line is configured to connect to the container to permit release of the fluid to its desired location within the nacelle. Accordingly, the replacement of fluids becomes more straightforward and can be carried out using AVs or cranes.

In addition to the carriages described herein, the carriage may also take the form of an extendible arm configured to extend out of the nacelle with the component mounted to the arm. Other carriage types are also possible.

The nacelle may further comprise, either as part of the carriage or separately, a lifting system, such as a lifting arm, controllable to move components into and out of the carriage. The carriage and/or the lifting arm may be configured to have some autonomy of operation so that components can be automatically located and loaded and/or transferred between the inside and outside of the nacelle.

Figure 10:
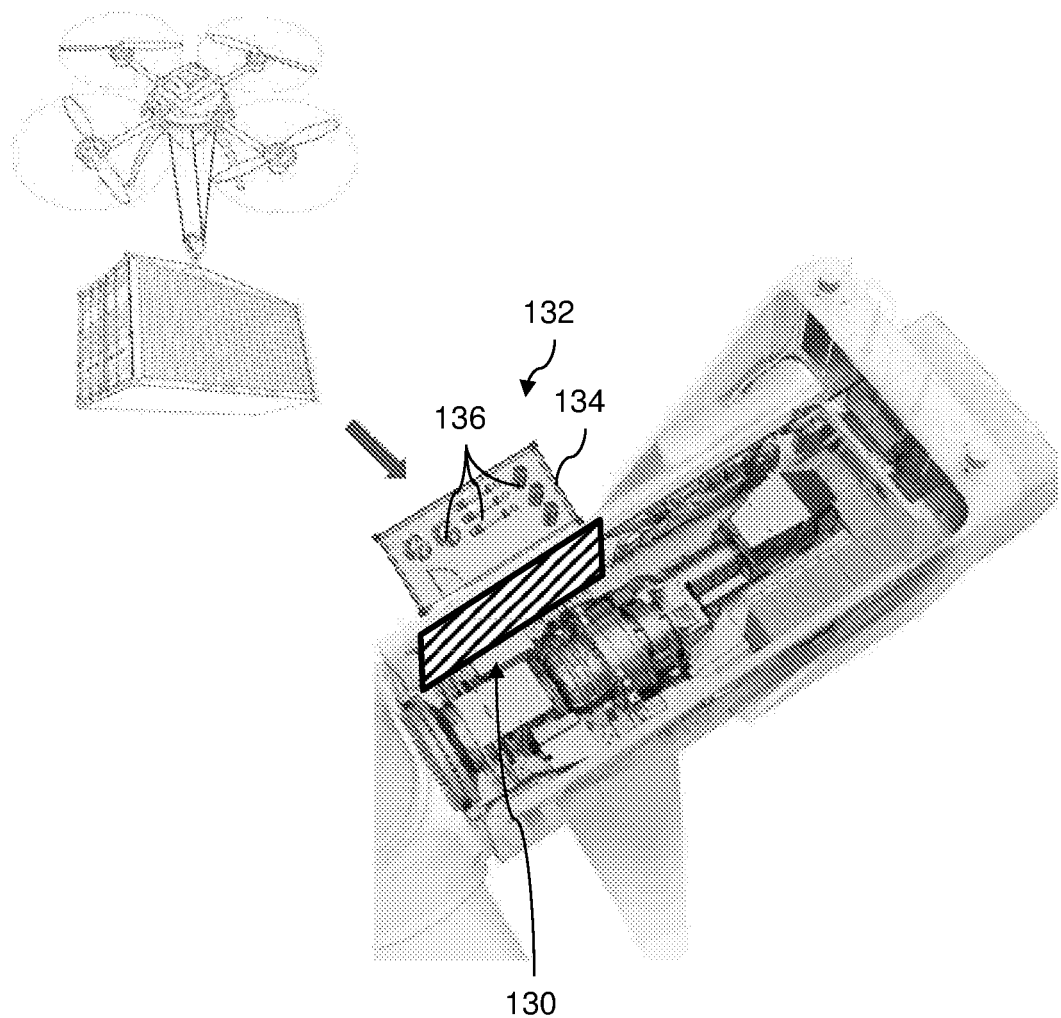
FIG. 10 shows a perspective view of part of a wind turbine to which a maintenance station is externally mounted according to a further embodiment of the invention.

While the above embodiments all concern the use of a carriage to move components from inside to outside the housing, the positioning of mounts and components adjacent a maintenance opening in the housing may be used in different circumstances. Particularly, as shown in FIG. 10, a mount (not visible) may be provided on an exterior surface of the housing 26 adjacent a maintenance opening 130. In FIG. 10, the mount is provided on the second side wall 30. The mount may be provided to allow mounting of a component comprising a maintenance station 132 or support system. As shown, the maintenance station 132 comprises a container 134 within which maintenance equipment 136 is provided. The container 134 comprises an access opening (not visible in FIG. 10) in one of its faces and a mount (not visible in FIG. 10) for connecting to the mount on the housing 26 of the nacelle 14. The mounts are configured to connect to affix the maintenance station 132 to the exterior of the housing 26 so that the maintenance opening 130 and the access opening of the container are facing one another. Thus, when a maintenance worker within the nacelle 14 wishes to access equipment within the maintenance station 132, the access opening and maintenance opening are uncovered to create a path between the maintenance station 132 and the internal volume 24 of the nacelle 14. The maintenance station 132 may also be useful in transporting components to the nacelle as an alternative to the carriage.

Figure 11:
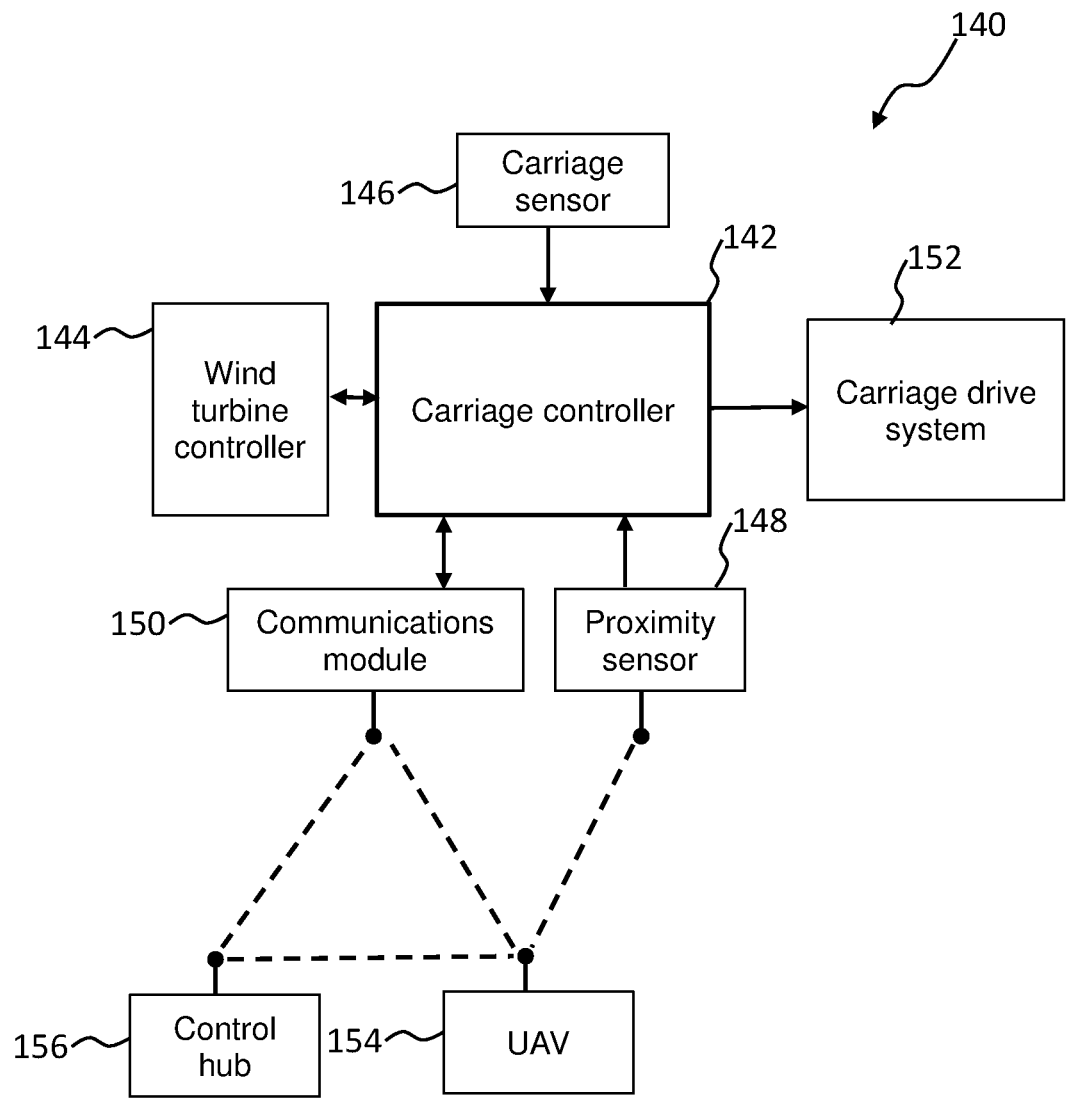
FIG. 11 shows a schematic representation of a control system for a nacelle according to an embodiment of the invention.

To enable transfer of components between the internal volume and the exterior of the nacelle, coordination is required between the wind turbine and the AV delivering or removing the components. Accordingly, in some embodiments, the nacelle is provided with a control system configured to communicate with the AV and a control hub associated with the AV to enable deployment of the carriage as required. An example control system is shown in FIG. 11.

It will be appreciated that in other components, movement of the carriage may be effected by the AV and/or a maintenance worker.

The control system 140 comprises a carriage controller 142 in communication with a wind turbine controller 144. A separate wind turbine controller 144 is depicted here to make the figure easier to describe, but it is likely that the carriage controller 142 will be integrated within a wind turbine controller 144, and that the carriage controller 142 will liaise with other parts and functionalities of the wind turbine controller 144. The carriage controller 142 receives data from a carriage sensor 146 configured to determine the proximity of components to the carriage and/or the presence of components within the carriage, a proximity sensor 148, and a communications module 150. The carriage controller 142 outputs commands to a carriage drive system 152 and the communications module 150. The communications module 150 is configured to communicate with one or both of a UAV 154 and a control hub 156 controlling or associated with the UAV 154, while the proximity sensor 148 detects the proximity of the UAV 154 to the wind turbine 10. In some embodiments, the proximity sensor 148 and communications module 150 are integral with one another.

In use, the control hub 156 and UAV 154 communicate with the carriage controller 142 via the communications module 150. The carriage controller 142 determines, based on the communications via the communications module 150 and, if applicable, data received from the proximity sensor 148, an optimum time to move the carriage from the first position to the second position. The drive system 152, which may comprise a motor configured to drive one or more belts or chains or gears to move the carriage, receives instructions from the carriage controller 142 and operates to move the carriage accordingly. When the carriage is in the second position, the carriage sensor 146 determines when a component is placed within or removed from the carriage, and communicates this to the carriage controller 142. Once the UAV 154 has moved away from the turbine, based on further communications between the UAV 154, the control hub 156, and the communications module 150 and/or based on data from the proximity sensor 148, the carriage controller 142 commands the drive system 152 to move the carriage from the second position to the first position.

If the system includes a disconnection mechanism or an operable mount configured to release a component for removal or to connect a component during mounting, the carriage controller may also distribute commands to this mechanism to enable the correct action to be performed.

UAVs can be deployed relatively autonomously, in that they are able to follow pre-programmed schedules and find turbine locations, but can also be controlled on-the-fly by operators at a control hub, which may also be termed as a base station or central drone control station, using a suitable user terminal or interface. The UAVs are suitably equipped for autonomous flight and so will have a suitable on-board software platform for this purpose. Autonomous flight systems are generally known in the art and so will not be discussed in detail here. Briefly, however, each UAV will comprise suitable sensing systems to provide it with flight data relating to its position, orientation, velocity, angular velocity, and acceleration, for example. Such data may be derived from a state estimator coupled to sensing systems such as GPS, LiDAR, optical imaging systems, inertial measurement units (IMUs) and the like.

Processors and/or controllers may comprise one or more computational processors, and/or control elements having one or more electronic processors. Uses of the term "processor" or "controller" herein should therefore be considered to refer either to a single processor, controller or control element, or to pluralities of the same; which pluralities may operate in concert to provide the functions described. Furthermore, individual and/or separate functions of the processor(s) or controller(s) may be hosted by or undertaken in different control units, processors or controllers.

To configure a processor or controller, a suitable set of instructions may be provided which, when executed, cause the control unit, computer system, computer device or the like to implement the techniques described herein. The set of instructions may suitably be embedded in the one or more electronic processors. Alternatively, the set of instructions may be provided as software to be executed on the computational device.

Although the components discussed herein are functional components of the nacelle or tools, the component in the carriage may be a component for connecting with the drone. For example, in some examples, the component may comprise a charging station for the AV. In use, therefore, the carriage moves the charging station to the outside of the nacelle, the AV lands on the charging station, and recharges. Once the AV has charged, it can take off again and return to its maintenance.

In another embodiment, the component may comprise a fluid filling station that the AV lands on in order to form a fluid flow path with one or more other components within the wind turbine. The AV may carry a container of fluid or a storage container for fluid, and a pump for pumping fluid along a connector line. The connector line of the AV is configured to interface with a valve in the fluid filling station and to either sample or replenish operational fluid within a component such as lubricant, coolant, or other operational fluids.

While carriages are discussed above as being mounted to a nacelle, in some embodiments a carriage may be provided on an AV and used to transfer components into and out of the nacelle. A carriage on an AV may be as described herein, or may alternatively be in the form of a robotic arm configured to reach through a maintenance opening to access components.

It will be appreciated that various changes and modifications can be made to the present invention without departing from the scope of the present application.

The invention claimed is:

1. A nacelle for a wind turbine generator, the nacelle comprising:
   a housing surrounding an internal volume of the nacelle, the housing having a maintenance opening for transferring one or more components into and out of the nacelle; and
   a carriage affixed to the nacelle and configured to hold the one or more components, the carriage being movable between a first position and a second position to transfer the one or more components through the maintenance opening, wherein when the carriage is in the first position, the one or more components are held entirely within the internal volume, and wherein when the carriage is in the second position, the one or more components are held adjacent to but entirely outside the housing,
   wherein the carriage is configured to perform only one of:
      (i) a rotation about a first axis to move between the first position and the second position; or (ii) a translation along a second axis to move between the first position and the second position, and wherein the one or more components are removable from or placeable upon the carriage when the carriage is in the second position for transport of the one or more components away from or to, respectively, the nacelle.

2. The nacelle of claim 1, wherein the carriage comprises a plate arranged to cover the maintenance opening when the carriage is in the first position.

3. The nacelle of claim 1, wherein the first axis is parallel to a lower edge of the opening, and wherein the carriage forms a shelf beneath the maintenance opening when the carriage is in the second position.

4. The nacelle of claim 1, wherein the carriage comprises one or more mounts for removably securing the one or more components to the carriage.

5. The nacelle of claim 4, wherein the one or more components comprise modular components of a modularized internal system of the nacelle, the modularized internal system comprising at least one of: an electrical converter; a control system; a drivetrain; and a sensing system.

6. The nacelle of claim 1, wherein the one or more components comprises a fluid container, and wherein the carriage is configured to connect the fluid container to a flow line to permit fluid flow between an internal system of the nacelle and the container.

7. The nacelle of claim 1, wherein the housing comprises:
a main opening in a roof of the housing that is separate to the maintenance opening and has a larger area than the maintenance opening; and
an access opening for allowing access from a tower of the wind turbine generator, the access opening being separate to the maintenance opening.

8. The nacelle of claim 1, wherein the maintenance opening is provided in one of: a side, a roof, a base, a front, and a rear of the housing.

9. The nacelle of claim 1, comprising a drive system configured to move the carriage between the first and second positions, and a control system for controlling the drive system.

10. The nacelle of claim 1, wherein, in the first position, the carriage is positioned within the internal volume directly adjacent the maintenance opening.

11. The nacelle of claim 1, wherein when the carriage is in the second position, the one or more components may be removed from or placed upon the carriage at any yaw position of the nacelle.

12. The nacelle of claim 1, wherein when the carriage is in the first position, a portion of the carriage covers the maintenance opening and is flush with the housing in which the maintenance opening is formed.

13. A wind turbine generator comprising the nacelle of claim 1.

14. A method for transferring components to a wind turbine generator, the method comprising:
providing a nacelle including:
a housing surrounding an internal volume of the nacelle, the housing having a maintenance opening; and
a carriage affixed to the nacelle and configured to hold one or more components, the carriage being movable between a first position and a second position to transfer the one or more components through the maintenance opening, wherein when the carriage is in the first position, the one or more components are configured to be entirely held within the internal volume of the nacelle, and wherein when the carriage is in the second position, the one or more components are configured to be adjacent to but entirely outside the housing, and wherein the carriage is configured to perform only one of: (i) a rotation about a first axis to move between the first position and the second position; or (ii) a translation along a second axis to move between the first position and the second position,
operating an aerial vehicle to navigate from a base station to the wind turbine generator;
positioning the carriage in the second position;
transferring the one or more components from a mounting position on the aerial vehicle to the carriage;
moving the carriage from the second position to the first position to locate the one or more components within the internal volume of the nacelle, and
operating the aerial vehicle to return to the base station.

15. A method for transferring components from a wind turbine generator, the method comprising:
providing a nacelle including:
a housing surrounding an internal volume of the nacelle, the housing having a maintenance opening; and
a carriage affixed to the nacelle and configured to hold one or more components, the carriage being movable between a first position and a second position to transfer the one or more components through the maintenance opening, wherein when the carriage is in the first position, the one or more components are configured to be entirely held within the internal volume of the nacelle, and wherein when the carriage is in the second position, the one or more components are configured to be adjacent to but entirely outside the housing, and wherein the carriage is configured to perform only one of: (i) a rotation about a first axis to move between the first position and the second position; or (ii) a translation along a second axis to move between the first position and the second position,
operating an aerial vehicle to navigate from a base station to the wind turbine generator;
moving the carriage from the first position to the second position to locate the one or more components entirely outside the housing of the nacelle, and
transferring the one or more components from the carrier to a mounting position on the aerial vehicle; and
operating the aerial vehicle to return to the base station.

* * * * *